US009003954B2

(12) United States Patent
Salter et al.

(10) Patent No.: US 9,003,954 B2
(45) Date of Patent: Apr. 14, 2015

(54) VARIABLE DISPLACEMENT RADIAL PISTON FLUID WORKING MACHINE

(75) Inventors: Stephen Hugh Salter, Edinburgh (GB); William Hugh Salvin Rampen, Edinburgh (GB); Uwe Bernhard Pascal Stein, Edinburgh (GB); Robert George Fox, Peebles (GB)

(73) Assignee: Artemis Intelligent Power Limited, Loanhead (GB)

( * ) Notice: Subject to any disclaimer, the term of this patent is extended or adjusted under 35 U.S.C. 154(b) by 693 days.

(21) Appl. No.: 13/319,583

(22) PCT Filed: Feb. 23, 2011

(86) PCT No.: PCT/GB2011/050355
§ 371 (c)(1),
(2), (4) Date: Nov. 9, 2011

(87) PCT Pub. No.: WO2011/104544
PCT Pub. Date: Sep. 1, 2011

(65) Prior Publication Data
US 2012/0060685 A1    Mar. 15, 2012

(30) Foreign Application Priority Data

Feb. 23, 2010  (GB) .................................. 1003003.9
Aug. 17, 2010  (GB) .................................. 1013773.5

(51) Int. Cl.
*F03D 9/00*  (2006.01)
*F04B 1/053*  (2006.01)
(Continued)

(52) U.S. Cl.
CPC .............. *F04B 1/0538* (2013.01); *F03D 1/003* (2013.01); *F03D 9/001* (2013.01); *F03D 11/02* (2013.01); *Y02E 10/722* (2013.01)

(58) Field of Classification Search
CPC ....... F04B 1/0538; F03D 1/003; F03D 9/001; Y02E 10/722
USPC .......................... 92/72, 128; 91/493, 494, 498
See application file for complete search history.

(56) References Cited

U.S. PATENT DOCUMENTS 3,964,450 A *   6/1976   Lockshaw ........................ 91/493
5,657,681 A     8/1997   Henricson
(Continued)

FOREIGN PATENT DOCUMENTS

DE     3500432     7/1986
DE     4318073     12/1993
(Continued)

OTHER PUBLICATIONS

Rampen, W.H.S., Taylor, J.R.M., Riddoch, F., "Gearless transmissions for large wind turbines", DEWEK, Bremen, 2006.
(Continued)

*Primary Examiner* — Thomas E Lazo
(74) *Attorney, Agent, or Firm* — Lowe Hauptman & Ham, LLP

(57) ABSTRACT

A variable displacement fluid working machine includes an inward ring and an outward ring, one of the inward ring and the outward ring including a rotatable ring cam coupled to a drive shaft, the other including a plurality of radially extending piston cylinders circumferentially spaced around the respective ring. The outward ring has first and second axially spaced structural members and a plurality of demountable blocks demountably retainable therebetween, the demountable blocks having either piston cylinders or ring cam segments. The demountable blocks are removable radially to facilitate maintenance and repair and to facilitate radial access to the inward ring.

28 Claims, 8 Drawing Sheets

(51) Int. Cl.
*F03D 1/00* (2006.01)
*F03D 11/02* (2006.01)

(56) References Cited

U.S. PATENT DOCUMENTS

| | | | | |
|---|---|---|---|---|
| 6,846,163 | B2 * | 1/2005 | Takahashi et al. | 92/72 |
| 6,978,713 | B2 * | 12/2005 | Allart et al. | 92/72 |
| 7,097,437 | B2 * | 8/2006 | Kimura et al. | 91/494 |
| 8,074,450 | B2 * | 12/2011 | Nies et al. | 92/72 |

FOREIGN PATENT DOCUMENTS

| | | |
|---|---|---|
| DE | 4318073 A1 * | 12/1993 |
| EP | 1985853 | 10/2008 |
| EP | 2151574 | 2/2010 |
| GB | 1261172 | 1/1972 |
| WO | 2004025122 | 3/2004 |

OTHER PUBLICATIONS

Rampen W.H.S, Almond J.P, Taylor J.R.M, Ehsan Md. and Salter S.H, "Progress on the Development of the Wedding-Cake Digital Hydraulic Pump/Motor", 2nd European Wave Power Conference, Lisbon, Nov. 8-10, 1995.

Salter, S.H., "Proposal for a Large, Vertical-Axis Tidal-Stream Generator with Ring-Cam Hydraulics", Third European Wave Energy Conference, Sep. 30-Oct. 2, 1998, Patras Greece.

\* cited by examiner

VARIABLE DISPLACEMENT RADIAL PISTON FLUID WORKING MACHINE

RELATED APPLICATIONS

The present application a National Phase of International Application Number PCT/GB2011/050355, filed Feb. 23, 2011 and claims priority from, British Application Number 1003003.9, filed Feb. 23, 2010, and British Application Number 1013773.5, filed Aug. 17, 2010.

FIELD OF THE INVENTION

The invention relates to variable displacement radial piston fluid working machines having a rotating ring cam. The invention is of especial relevance to large fluid working machines for use in environments where maintenance is difficult, for example, in the nacelle of a wind turbine tower.

BACKGROUND TO THE INVENTION

Fluid working machines include fluid-driven and/or fluid-driving machines, such as pumps, motors, and machines which can function as either a pump or as a motor in different operating modes.

When a fluid working machine operates as a pump, a low pressure manifold typically acts as a net source of fluid and a high pressure manifold typically acts as a net sink for fluid. When a fluid working machine operates as a motor, a high pressure manifold typically acts as a net source of fluid and a low pressure manifold typically acts as a net sink for fluid. Within this description and the appended claims, the terms "high pressure manifold" and "low pressure manifold" are relative, with the relative pressures being determined by the application. In some embodiments of the present invention the pressure within the low pressure manifold is significantly higher than atmospheric pressure, for example, several atmospheres, however, it will be less than the pressure in the high pressure manifold during normal operation. A fluid working machine may have more than one low pressure manifold and more than one high pressure manifold.

Large displacement ring cam fluid working machines (i.e. those having a large rotating annular cam driving a multitude of pistons arranged around the cam, with each piston cycling multiple times per cam revolution) are known and are proposed for use in renewable energy applications in which there is a low speed rotating input but a relatively high speed electrical generator (Rampen, Taylor & Riddoch, *Gearless transmissions for wind turbines*, DEWEK, Bremen, December 2006). Ring cam fluid working machines typically have a plurality of rollers rolling on a wave shaped cam and driving pistons within cylinders. Either the pistons and cylinders may rotate inside the cam or the cam may rotate inside the pistons and cylinders. Such pumps driving relatively small hydraulic motors have been proposed as robust variable speed transmissions not just for wind turbine generators, but also for tidal stream and gravity-fed hydroelectric generators. Variable displacement could be added to the pumps or the motors, or both, using the operating principle above, for example.

However, large ring cam machines are difficult and expensive to repair, requiring disassembly of the whole body to repair even one working chamber. This is particularly expensive in renewable energy applications because the heavy pump must be brought to the surface, requiring a large and costly crane at typically a remote location.

Accordingly, the invention aims to provide a fluid working machine which is readily repairable in situ, even if the machine is massive (e.g. greater than 500 kg) and in a location which is difficult to access.

EP 0 692 071 proposed a modular construction in which the ring cam is made up of segments having confronting ends joined at a tongue and groove formation across which the rollers roll, and bolted via flanges to a rotating shaft. It was also proposed to provide removable piston and cylinder carrying units, bolted to each other around or within the ring cam. This machine suffers from difficulty of repair in situ in a working application because the supporting structure of the machine is broken when the pumping modules are bolted to a surrounding frame which prevents their removal without dismantling the frame.

EP 1 985 853 (Golle) discloses a pump from which piston cylinders can be demounted, but only partially exposing an internal ring cam surface. This makes it impossible to maintain the ring cam without removal of the shaft from the pump. Also, the pump of Golle includes a single metal body with bores within which the piston cylinders are received and, accordingly, it is relatively heavy for a given fluid displacement and it would be difficult to access and maintain components of the pump if it were built to a large scale suitable for, e.g. a wind turbine generator nacelle.

Accordingly, the invention aims to provide a fluid working machine which can retain its structural integrity during maintenance. Related to this, large fluid working machines for high torque applications require a structure which retains its structural integrity despite that substantial forces arising from the weight of the machine and the torque of the load (in the case of a motor) or input (in the case of a pump). This can be most simply obtain by providing large structural elements, for example, a large chassis or housing. However, the mass of the resulting components can be substantial and the invention aims to provide a structure which has sufficient mechanical strength while minimising the mass of the structural elements which are required to maintain integrity in use.

SUMMARY OF THE INVENTION

According to a first aspect of the present invention there is provided a variable displacement radial piston fluid working machine, the fluid working machine comprising:

an inward ring and an outward ring around (typically, concentric with) the inward ring;

one of the inward ring and the outward ring comprising a rotatable ring cam, the other comprising a plurality of radially extending cylinders circumferentially spaced around the respective ring, each cylinder having a piston reciprocably mounted therein;

a drive shaft coupled to the ring cam;

the outward ring comprising first and second axially spaced structural members and a plurality of demountable blocks demountably retainable therebetween, each of the plurality of demountable blocks comprising either at least some of the said plurality of cylinders (where the outward ring comprises the plurality of radially extending cylinder) or a segment of the ring cam (where the outward ring comprises the ring cam) respectively, each said block being mountable to locate one or more said cylinders in opposing relation to a portion of the ring cam to enable the pistons to be driven by the ring cam (optionally through one or more other components, such as a cam roller) and demountable to expose the inward ring for access.

Thus, the demountable blocks, which must be present in operation to enable the ring cam to drive the pistons, are individually removable to facilitate repair and maintenance, not only of the demountable blocks, but of whichever of the ring cam and the plurality of cylinders are part of the inward ring. As the pumps typically have a mass in excess of 500 kg, and may be mounted in inaccessible locations (e.g. in a nacelle on the tower of a wind turbine installation), the facility to readily access the inward ring for the purpose of maintenance (including inspection) and repair (including replacement) is of considerable practical benefit. Only one, or a small number of, demountable blocks need to be removed to access part of the radially inwards ring. Furthermore, the demountable blocks can fulfil a structural role in maintaining the integrity of the outward ring, enabling the overall mass of the outward ring to be lower than would otherwise be the case.

Typically, when the device is fully assembled, the pistons are driven by the ring cam through rollers mounted to the pistons. Each cylinder, and its respective piston, together defines a working chamber having a volume which varies cyclically with rotation of the ring cam. One end of each cylinder is typically directed towards the ring cam in the assembled machine and the cylinders may extend radially away or towards an axis of the inner ring or, more typically, at a slight angle to radially away or towards an axis of the inner ring to counteract tangential forces arising from friction.

Typically, the demountable blocks are demountable by radially outward movement, facilitating access for maintenance from the periphery of the outward ring. Preferably, the demountable blocks are individually demountable. Thus, while one, or a small proportion of the demountable blocks are removed, the remaining mounted blocks can still fulfil their structural role in supporting and maintaining the integrity of the outward ring.

Demountable blocks demountably retained between the first and second axially spaced structural elements may act to resist forces between the first and second axially spaced structural members.

In practice, there will typically be significant forces acting between the structural elements, and the demountable blocks can be employed to resist these forces. These forces may be vertical, axial and/or torsional forces. The forces between structural elements include forces arising from the weight of components of the machine bearing on the drive shaft, radial forces acting to separate the pistons and ring cam, and tangential forces from the action of the pistons on the ring cam in use. There may also be shear forces acting between the first and second axially spaced structural elements arising from the torque exerted on the drive shaft.

One of the first and second axially spaced structural elements may comprise or be attached to a coupling for coupling the fluid working machine to a support through the said one of the first and second axially spaced structural elements.

In this case, the weight of the fluid working machine can therefore be supported through a single one of the first and second axially spaced structural elements (in addition to weight bearing on the drive shaft, typically through bearings). This is a convenient mechanism for attaching a fluid working machine, particularly one of generally toroidal shape, to a support. However, the weight of the second axially spaced structural element will be borne at least in part by the coupling between the first and second axially spaced structural elements and this is a further force which can be borne by the demountable blocks.

The ability of the demountable blocks to resist forces between the first and second axially spaced structural elements is of further benefit in embodiments in which the demountable blocks comprise the cylinders and define a volume which receives working fluid having a preloaded pressure in use, for example, working fluid with a pressure of at least two atmospheres. It can be advantageous for the demountable blocks to define a volume, which may be outwards of the cylinders, which receives working fluid having a preloaded pressure which is supplied into the working chambers in use. The resulting pressure in the working chambers assists in providing a pressure holding the pistons (typically through cam rollers) against the ring cam. In this case, the pressurised working fluid may exert additional forces acting to urge the first and second axially spaced structural elements apart or to urge the demountable blocks radially outwards. In this case, the provision of demountable blocks which can act to resist forces acting between the first and second axially spaced structural elements is of additional benefit.

Therefore, by providing blocks which resist forces acting between the first and second structural elements and comprise either one or some of the cylinders, or a segment of the ring cam, and which are demountable, the requirement for additional strengthening elements to resist some or all of the forces described above, in addition to the said one or some cylinders, or ring cam segment, is reduced or removed. This can enable the mass of the machine to be less than would otherwise be the case.

One or both of the first and second axially spaced structural elements may extend radially inwards at least as far as, or inward of whichever of the ring cam and the plurality of cylinders are part of the inward ring. One or both of the first and second axially spaced structural elements may take the form of disks. The first and second axially spaced structural elements may be parallel disks.

The first and second axially spaced structural elements may be independently mounted on bearings. The drive shaft may extend through at least one of the axially spaced structural elements.

The drive shaft may extend through or terminate within or before the other of the axially spaced structural elements. The first and second axially spaced structural elements typically extend to either side of the inner ring. For example, wherein the inner ring comprises a ring cam, the first and second axially spaced structural elements are typically spaced apart, on either side of the ring cam, to retain the demountable blocks around the ring cam. Whichever of the ring cam and the plurality of cylinders are part of the inward ring is typically located between the first and second axially spaced structural members. Indeed, both the ring cam and the plurality of cylinders may be located between the first and second axially spaced structural members.

The first and second axially spaced structural elements and the demountable blocks may comprise cooperating formations for bolting the demountable blocks to each of the first and second axially spaced structural elements both axially and radially.

This provides additional mechanical strength in the assembled structure. Axial bolts tie the axially spaced structural elements together and resist forces arising from, for example, the weight of one of the structural elements or a preloaded pressure within the demountable blocks. Radial bolts resist shear and forces arising from preloaded pressure. The radial bolts are typically applied under sufficient tension to together provide a force in a radial inwards direction which exceeds the outward force acting on the demountable blocks which is anticipated from the preloaded pressure of the working fluid (where present) and the radial force exerted on the pistons during rotation of the cam track in use, so that the radial bolts remain in tension in use.

Preferably, each demountable block comprises cooperating formations for bolting the demountable block both axially and radially at least two circumferentially spaced locations (typically close to opposite ends) to each of the first and second axially spaced structural elements.

The first and second axially spaced structural elements may each comprise one or more shoulders having a radially outward surface for engaging with the demountable blocks, the demountable blocks having cooperating radially inward surfaces.

Preferably, at least some cylinders of the segment of the ring cam of a demountable block are mounted to the body of the demountable block (which is in turn demountably mountable to the first and second axially spaced elements) and not directly mounted to the first or second axially spaced structural elements. This facilitates removal of the demountable blocks.

The shoulders typically extend in a ring around the respective axially spaced structural elements. The shoulders are typically located at, or close to, the circumference of the axially spaced structural elements. The shoulders may serve to locate the demountable blocks and, in particular, to define the distance between a mounted block and the ring cam. The shoulders may comprise fixtures (such as bolt holes) for radially bolting demountable blocks to the structural elements. The first and/or second axially spaced structural elements may be circular and the circumferential shoulders may be at a radius less that the outer radius of the first or second axially spaced structural elements.

It may be that the demountable blocks are cylinder blocks, comprising one or more said cylinders, and the inward ring comprises a ring cam. In this case, the ring cam may comprises a plurality of ring cam segments (each of which comprises a part of the cam surface of the ring cam) which are individually removable in a radially outward direction between the first and second axially spaced structural elements when the or each cylinder block which would otherwise overlay the respective ring cam segment is demounted. Thus, not only may the cylinder blocks be removed in a radially outwards direction, the ring cam segments can be individually removed in a radially outwards direction. Thus, the ring cam can be maintained or replaced by the removal of individual ring cam segments in turn, without requiring the entire ring cam to be exposed, which would be difficult and time consuming for a large pump in an inaccessible location.

It may be that the demountable blocks comprise ring cam segments. In this case, the inner ring may contain a plurality of cylinder blocks, each of which comprises one or more cylinders, which are accessible for maintenance (typically in a radially inwards direction) through the space left by a removed ring cam segment.

Typically, the outward ring is continuous. Typically, the first and second axially spaced structural elements are continuous (and typically each has a unitary construction). The first and second axially spaced structural elements may have continuous substantially circular perimeters.

In some embodiments, the ring cam further comprises a side plate, on one or both sides thereof. The side plates extend around the circumference of the ring cam and prevent the rollers (or other means of operative engagement between the said pistons and the ring cam) from sliding off (i.e. in an axial direction) the wave-like surface of the ring cam.

Typically, the or each side plate abuts an edge of the cam surface, around the circumference of the ring cam. Thus, in use, a cam roller (or other cam following element) is biased against the cam surface of the ring cam, and in at least some operating conditions the roller abuts the inner faces of the respective side plates, the side plates defining a track or trench within which the cam roller runs when the ring cam rotates with respect to the cam roller.

Accordingly, the invention extends in a further aspect to a ring cam for a fluid-working machine, having a cam surface and a side plates extending around one or both sides thereof, the or each side plate abutting the edge of the cam surface around the circumference of the ring cam.

Each said side plate may, in some embodiments, extend a fixed distance from the cam surface. Thus, a side plate of a ring cam having a wave-like cam surface will also have a wave-like circumference. In some embodiments, each said side plate extends from the cam surface a distance that is less, and preferably much less, than the radius of the or each roller (for example, less than 50%, or 25% or 10% of the radius of the each said roller).

In use, when the ring cam is rotating in relation to each said roller, the relative velocity of the cam surface and the surface of the roller (around the circumference of the cam surface) is zero (or negligible). The velocity of the external surfaces of the roller in relation to the cam surface, and thus also in relation to each said side plate (or any object or feature fixed in relation to the ring cam) increases with distance from the cam surface.

Thus, when the roller abuts the side plate it does so where the relative velocity of the roller and the side plate is low. Thus, the roller is prevented from moving laterally (i.e. in an axial direction) on the cam surface, whilst friction between the roller and the side plates is minimised.

In some embodiments, the external circumference of each said side plate is substantially circular.

The opposing inner faces of the side plates (of a ring cam having two side plates) may be parallel, or may diverge with distance from the axis of rotation of the ring cam. Preferably each said side plate meets the cam surface at the same angle as the angle at which the side of each said roller meets the cam surface (which is typically a right angle). Each said side plate may diverge from said roller (such that, in use, the side of roller contacts the side plate only close to the junction between the side plate and the cam surface).

The ring cam (and typically each said side plate) may comprise an abutment extending across a part of the inner surface of each said side plate, along the junction between the cam surface and each said side plate.

The abutment may extend a fixed distance from the cam surface. Thus, side plate of a cam having a wave-like cam surface will be provided with a wave like abutment.

The distance between the opposing inner surfaces of the side plates of a cam ring is larger than the distance between abutments along the respective junctions between the side plates and the cam surface.

Each said abutment typically extends from the cam surface a distance that is less, and preferably much less, than the radius of the or each roller (for example, less than 50%, or 25% or 10% of the radius of the each said roller).

An abutment extending across a part of the inner surface of a said side plate (a distance that is less, and preferably much less, than the radius of the or each roller), along the junction between the side plate and the cam surface, may abut in at least some operating conditions each said roller in the region (and typically a small region) where the roller contacts the cam surface and the roller is prevented from contacting the side plate directly, in normal use.

In use, when the ring cam is rotating in relation to each said roller, the relative velocity of the cam surface and the surface of the roller (around the circumference of the cam surface) is zero (or negligible). The velocity of the external surfaces of the roller in relation to the cam surface, and thus also in relation to each said side plate (or any object or feature fixed in relation to the ring cam) increases with distance from the cam surface.

Thus, the roller abuts the abutment at a region where the relative velocity of the roller and the abutment is low. Thus, the roller is prevented from moving laterally (i.e. in an axial direction) on the cam surface by the abutments, whilst friction between the roller and the side plates is minimised.

The surface material of the abutment, or the entire abutment, may be a different material to the material of the side plate. The abutment may comprise or consist of a resilient material, or a low friction material. The abutment may be a hard wearing and/or low friction coating on the surface of the side plate along the junction between the cam surface and each said side plate. The abutment may be formed from the material of the side plate and the side plate (or side plate segment and abutment may be unitary.

In embodiments with two or more ring cams, there may be one side plate positioned intermediate two cam rings, the said side plate functioning to prevent rollers from sliding off both cam rings. Alternatively, each said cam ring may have two (separate, and not shared) side plates.

The side plates may be unitary, or may comprise a plurality of side plate segments. Thus, each ring cam segment may be secured to a side plate segment (or to two side place segments, to either side of the wave like surface of the ring cam segment). The ring cam may comprise the same number, fewer, or more, side plate segments disposed around each side of the circumference of the or each ring cam than the number of ring cam segments.

The side plates (or side plate segments, as the case may be) may be secured to the said segments by bolts (or other suitable fixings) extending through the side plate (or side plate segments) into or through the ring cam segments. In some embodiments, each said bolt may extend through more than one side plate (or segment thereof) and into or through more than one segment of more than one ring cam.

The side plate segments may be angularly offset from the cam segments so that each side plate overlaps two (or more) segments of the assembled ring cam, and in the assembled ring cam, the joint between side plate segments does not align or overlap with the joint between segments. The overlap may be used to axially (i.e. with respect to the shaft) align the cam segments. In some embodiments the side plates may be fixed to the shaft, or fixed relative to the valves and working chambers such that the cam segments move between the side plates.

In some embodiments, the side plate segments may be removable in a radially outward direction. Typically, each said ring cam segment is secured to one or more side plate segment (on one or both sides of the said ring cam segment) is be removable as a ring cam segment assembly (comprising a ring cam segment and one or more side plate segments secured thereto) in a radially outward direction.

The invention extends to ring cam segment assembly comprising a ring cam segment and one or more side plate segments secured thereto. Preferred and optional features of each said side plate segment correspond to preferred and optional features of the side plates herein disclosed.

Typically, one or more fluid manifolds (for example, a high pressure manifold for conveying pumped fluid to a load) extend through at least one of the axially spaced structural elements. Thus, at least one of the axially spaced structural elements typically comprises a plurality of ports for receiving working fluid from the said working chambers. For each said port, a seal is typically provided to resist leakage of fluid passing through the port from the cylinder blocks. Either or both ports typically comprise a non-return valve.

At least one of the axially spaced structural elements (typically a said shoulder thereof) may comprise one or more ports for receiving working fluid, and wherein each said cylinder block includes at least one cooperating port for expelling working fluid, either or both said ports including a seal, wherein the said ports and the or each seal are located on radially inward or outward facing surfaces.

The risk of damage to the seals is lower than would be the case if the ports and the or each seal were located on axially facing surfaces, as the demountable blocks can be slid radially inwards or radially outwards, against axially facing surfaces during the mounting and demounting process, without substantial friction being exerted on the or each seal. This is especially relevant if the or each seal stands proud of the surface including the port with which it is associated.

The fluid working machine may further comprise a plurality of manifolds and a plurality of valves, each of which is operable to regulate the flow of fluid between a working chamber and a manifold.

It is especially advantageous for the cylinders to be stationery and the ring cam to rotate in such machines, which employ valves to regulate the flow of fluid between a working chamber and a manifold in contrast to, for example, machines employing only port plates to regulate the flow of fluid between working chambers and manifolds.

The fluid working machine may, for example, be a fluid working pump having either or both a check valve for regulating the flow of fluid between a respective working chamber and a low pressure manifold and a check valve for regulating the flow of fluid between a respective working chamber and a high pressure manifold.

At least one valve associated with each working chamber may be an actively controllable valve. Typically, at least one valve associated with each working chamber is an electronically controllable valve. By an electronically controllable valve we refer to valves which may be one or more of actively opened, actively closed, actively held open against a pressure differential and actively closed against a pressure differential. Electronically controllable valves may be actively controlled in only some circumstances and may open or closed passively in other circumstances.

The fluid working machine may comprise a controller and at least one valve associated with each working chamber may be an actively controllable valve, controllable by the controller in phased relationship with cycles of working chamber volume to select the net displacement of working fluid by each working chamber on a cycle by cycle basis. Fluid working machines are known, for example, from EP 0 361 927 which disclosed a method of controlling the net throughput of fluid through a multi-chamber pump by opening and/or closing electronically controllable 'low pressure' poppet valves, in phased relationship to cycles of working chamber volume, to regulate fluid communication between individual working chambers of the pump and a low pressure manifold. As a result, individual chambers are selectable by a controller, on a cycle by cycle basis, to either displace a predetermined fixed volume of fluid or to undergo an idle cycle with no net displacement of fluid, thereby enabling the net throughput of the pump to be matched dynamically to demand.

EP 0 494 236 developed this principle and included electronically controllable 'high pressure' poppet valves which regulate fluid communication between individual working chambers and a high pressure manifold, thereby facilitating the provision of a fluid working machine functioning as either a pump or a motor in alternative operating modes. EP 1 537

333 introduced the possibility of part cycles, allowing individual cycles of individual working chambers to displace any of a plurality of different volumes of fluid to better match demand. Due to the complexity of fluid working machines of this type, it is especially advantageous that the invention provides a system with a rotating ring cam, enabling the actively controlled valves to remain substantially stationary in use.

By inward ring and outward ring we refer to the relative radial position of the said rings. Further rings having ring cams or cylinders may be provided. For example, a pump may comprise two ring cams, one facing outwards and one facing inwards, each of which drives a plurality of radially extending cylinders. Either ring may comprise a plurality of ring cams and the plurality of cylinders may be arranged in a plurality of axially spaced rings. Still further demountable blocks may be provided radially outward of the said demountable blocks, enabling three or more concentric rings of components to be removed in a radially outwards direction.

The invention also extends in a second aspect to a kit of parts which can be assembled to form a variable displacement radial piston fluid working machine according to the first aspect of the invention.

In a third aspect, the present invention extends to a variable displacement radial piston fluid working machine chassis, the chassis comprising:
  an inward ring and an outward ring around (typically, concentric with) the inward ring;
  one of the inward ring and the outward ring comprising a rotatable ring cam retaining formation (which may, for example, comprise the outward or inward periphery respectively of the ring and which, in the case of the inward ring, may in some embodiments have the rotatable ring cam coupled temporarily or permanently thereto), the other comprising a plurality of mountings for retaining radially extending cylinders circumferentially spaced around the respective ring (which may, in the case of the inward ring, have cylinders retained permanently or temporarily therein);
  a coupling to couple the ring cam retaining formation to a drive shaft (which may be a permanent coupling in the case where the drive shaft and ring cam retaining formation are integral);
  the outward ring comprising first and second axially spaced structural members for demountably retaining a plurality of demountable blocks comprising either at least some of the said plurality of cylinders or a segment of the ring cam respectively to locate one or more said cylinders in opposing relation to a portion of the ring cam to enable pistons slidably mounted within the cylinder to be driven by the ring cam (optionally through one or more other components, such as a cam roller).

Further optional and preferred features of the second and third aspects of the invention correspond to the optional and preferred features set out in respect of the first aspect of the invention.

The invention also extends in a fourth aspect to a turbine assembly comprising a variable displacement radial fluid working machine according to the first aspect of the invention and a turbine comprising a plurality of blades mounted to the drive shaft to transmit torque to the ring cam as the blades rotate.

The turbine assembly may be a wind turbine assembly. Typically, the wind turbine assembly includes a tower, with the radial fluid working machine mounted within the tower. The tower may be mounted on the sea bed, or the tower may float and be moored to the sea bed. The invention is especially applicable in such a location as access to the pump for maintenance would otherwise be difficult. However, the turbine assembly may comprise a turbine for receiving energy from a flowing fluid, for example, from tidal flows, or water flowing in a river or through a conduit in a hydroelectric power installation. The invention extends to a wind turbine nacelle comprising a fluid working machine according to the first aspect of the invention, operable as a pump for driving by a turbine (by way of the drive shaft).

It may be that the drive shaft of the fluid working machine and the rotating shaft of the turbine are each hollow and in communication with each other so that a human may access the interior of the turbine blades through the draft shaft.

According to a third aspect of the invention there is provided a method of maintaining a variable displacement machine according to the first aspect of the invention, or a turbine assembly according to the second aspect of the invention, comprising removing a demountable block and carrying out one or more of (a) maintaining the demountable block and remounting the maintained demountable block, (b) mounting a replacement demountable block in place of the demounted block, and (c) maintaining a portion of the inner ring through the space left by the demounted block.

By maintaining we include testing, repairing and replacing component parts. The demountable block is typically removed radially from the axially spaced structural members. Maintaining a portion of the inner ring through the space left by the demounted block may comprise removing a portion of the inner ring (for example, a ring cam portion, where the inner ring comprises the ring cam).

The portion of the inner ring which is removed may be removed radially. The removed portion may then be tested, repaired or replaced. The demounted block, or a replacement demounted block is then mounted back in position.

DETAILED DESCRIPTION OF AN EXAMPLE EMBODIMENT

Figure 1:
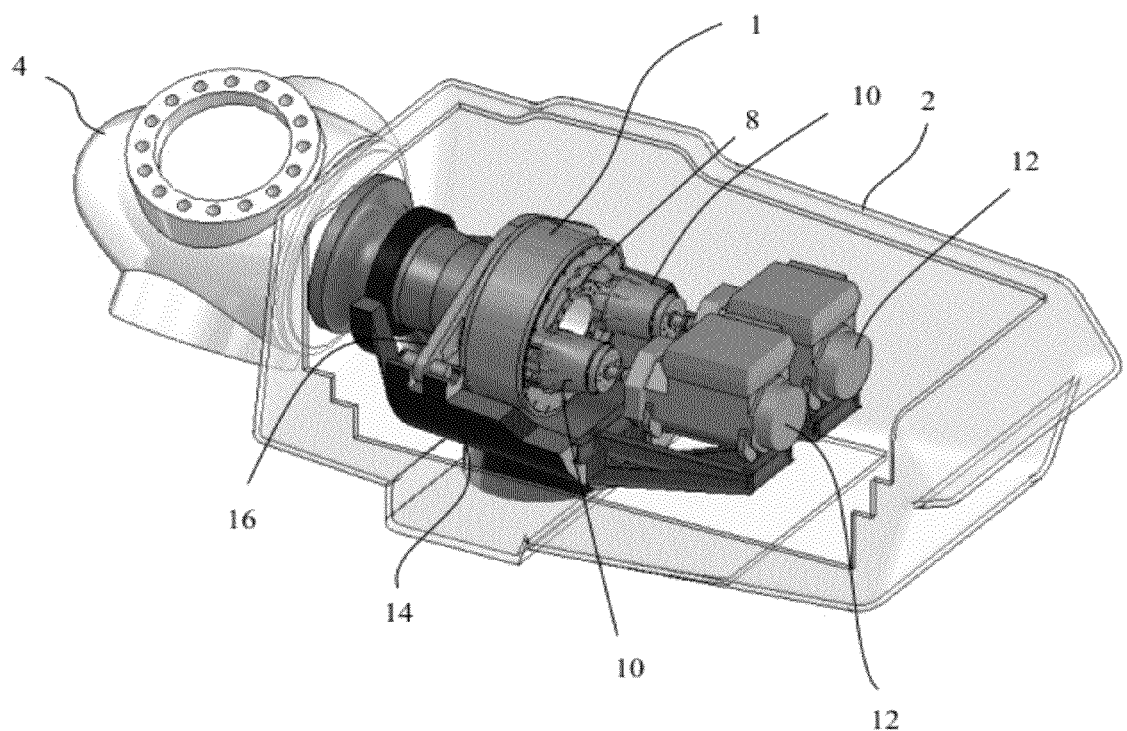
FIG. 1 is an isometric projection of the components of the nacelle of a wind turbine including a fluid working machine according to the present invention.

An example embodiment of the invention will now be described with reference to a pump for a wind turbine. However, fluid working machines according to the invention may be used for numerous alternative applications.

With reference to FIGS. 1 through 7, a variable displacement radial piston pump 1 (being an example of a variable displacement radial fluid working machine) has a size and construction suitable for application in the nacelle 2 of a wind turbine, where it is driven by a turbine 4. The turbine is connected through turbine shaft 6 to the hollow drive shaft 8 of the pump. Output pressurised fluid is used to drive motors 10 and electrical generators 12. The pump is connected to a chassis 14 through a mounting plate 16. As the drive shaft of the pump is hollow, it provides a convenient passage through which a person may pass to conduct maintenance and repair of other components, for example to gain access to the wind turbine blades.

The pump comprises first and second end plates 18A and 18B and a housing 20 which can be slid axially to reveal internal components for maintenance and repair. The pump is generally rotationally symmetric about an axis extending through the drive shaft. In this example, the pump is generally drum-like to minimise mass and size. Although the arrangement of cylinders (discussed below) should be generally circular, the shape of the outer periphery of the pump is less critical to its function.

The pump comprises an inward ring shown generally as 21, comprising a toroidal ring cam support 22 having a plurality of wave-like ring cam segments 23 demountably secured thereto in use and which together form a ring cam. The ring cam is multilobal and in this example, two ring cams are mounted to the ring cam support adjacent to each other and axially spaced.

The pump further comprises an outward ring shown generally as 24, comprising the first and second end plates 18A and 18B, which are independently mounted on the drive shaft 26 through bearings 28, and a plurality of demountable cylinder blocks 30. The drive shaft extends through both the first and second end plates and the end plates function as the first and second axially spaced structural members. The outward ring is continuous.

Figure 7:
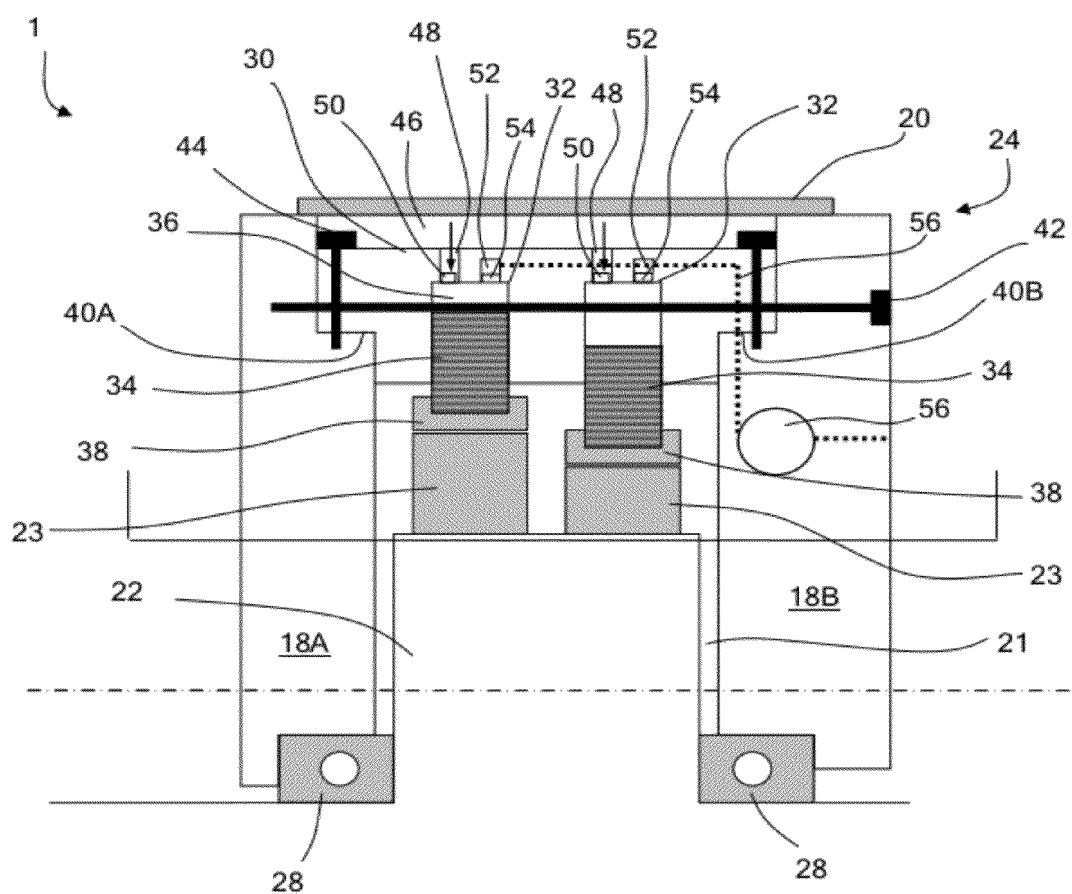
FIG. 7 is a schematic diagram of a radial cross section through a fluid working machine according to the invention.

The cylinder blocks are shown in cross-section in FIG. 7. Each comprises a plurality of cylinders 32 having a piston slidably mounted therein 34. Within each cylinder a working chamber of cyclically varying volume 36 is defined by the piston and the interior of the cylinder. Each piston is mounted on a roller 38 in driving engagement with the ring cam.

The first and second end plates each comprise a circular shoulder 40A and 40B, extending around the respective end plate, close to but within the outer perimeter of the first and second end plates. Each cylinder block is demountably retained on the circular shoulder. This defines the distance between each cylinder and the ring cam and provides structural strength. Each cylinder block is mounted in place by axial bolts 42 extending through apertures in the end plates and through the cylinder block, between cylinders, and also by radial bolts 44 extending through apertures in the cylinder blocks and into the circular shoulders. Typically, an axial bolt is provided towards each circumferentially spaced end of each cylinder block and a pair of radial bolts (one for each end plate) is provided towards each circumferentially spaced end of the each cylinder block.

The volume between the outer housing and the cylinder blocks functions as a low pressure manifold 46, receiving hydraulic fluid to be supplied to the pump. The fluid in the low pressure manifold has a preload pressure of a few atmospheres. This helps to force the pistons against the ring cam. Working fluid is supplied from this cavity into each working chamber through a conduit 48 and electronically controlled valve 50. A further conduit 52, functions as part of a high pressure manifold, receiving fluid via a check valve 54. The conduit extends through the cylinder block and radially inwards through ports in the cylinder block and the shoulder of the second end plate, to further conduits for output high pressure fluid 56. At least one of each pair of cooperating ports has a seal. The second end plate includes outflow ports (not shown) for delivering high pressure fluid to a load, such as a hydraulic motor which in turn drives an electricity generator.

In the assembled machine, the cylinder blocks not only function as housings for the piston cylinders, but also provide structural integrity. They are flush to both the first and second end plates and are axially and radially bolted into position in use, at each circumferentially spaced end. They can therefore resist forces acting between the end plates in use, for example forces arising from the weight of the pump which is supported predominantly through the mounting plate which is attached to only the first end plate, and torsional forces arising from the forces acting through the drive shaft and on the pistons, which do not extend directly radially but at a slight angle. The radial bolts also act to resist outwards forces on the cylinder blocks arising from the outwards forces of the ring cam acting on the pistons and the preload pressure in the low pressure manifold.

Figure 2:
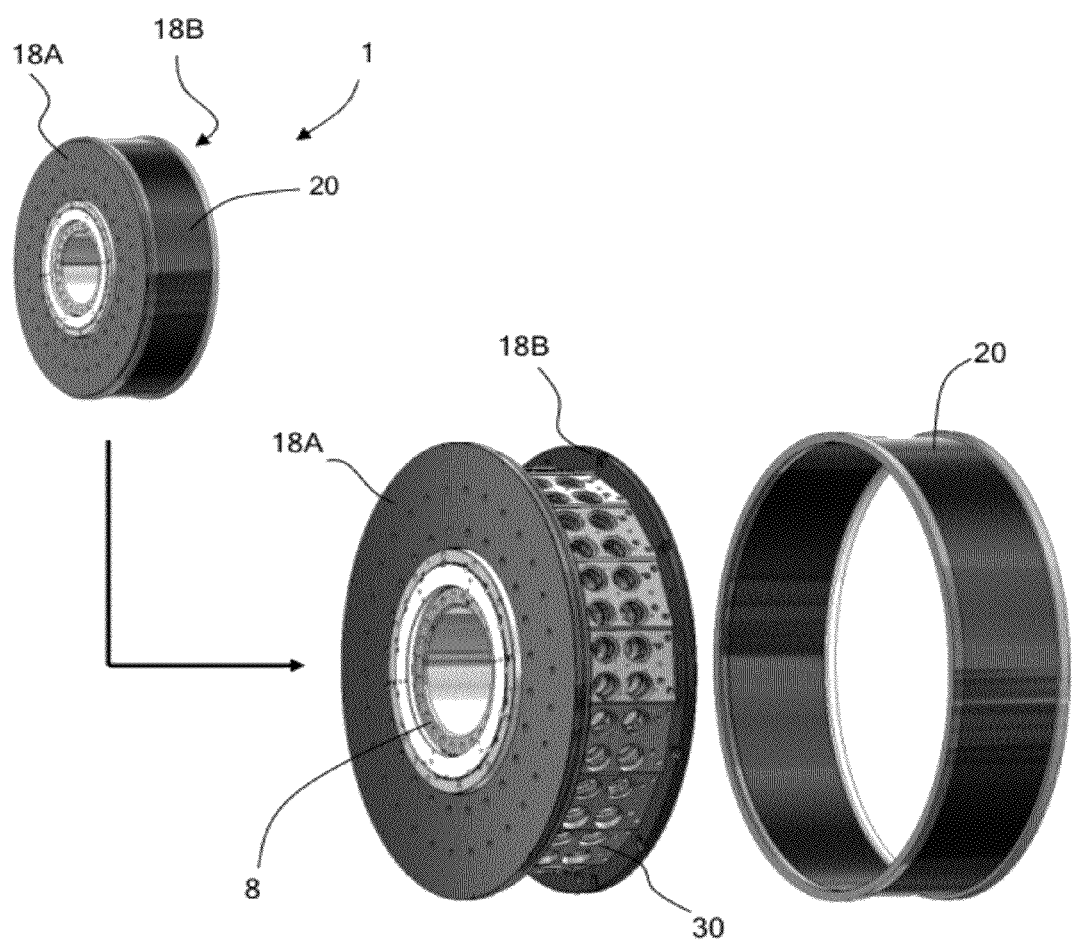
FIG. 2 is an isometric projection of an assembled fluid working machine, and (to a different scale) the fluid working machine with the housing removed to show the internal components.
Figure 3:
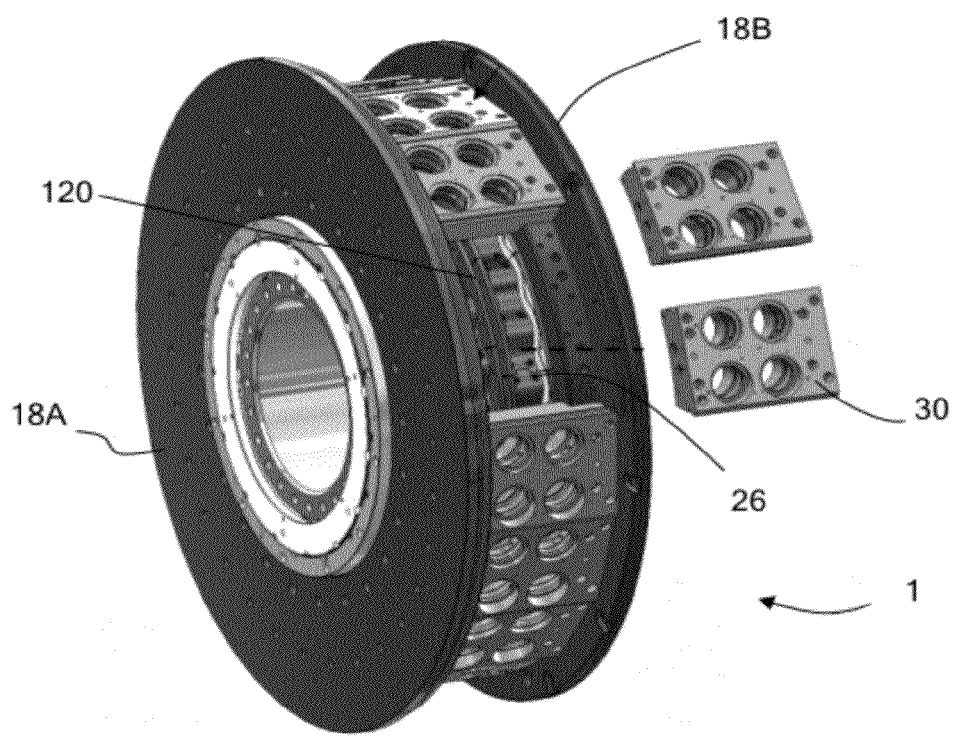
FIG. 3 is an isometric projection of the fluid working machine, without the housing, with two cylinder blocks removed.

For maintenance (including inspection) and repair, the housing is removed axially as shown in FIG. 2, exposing the cylinder blocks. One, or a small number, of cylinder blocks may be removed radially as illustrated in FIG. 3, revealing the inner ring including the surface of the ring cam, which can be accessed radially. Typically, only one or a small number of cylinder blocks will be demounted at once. Indeed, due to their structural role, it may not be possible to remove more than a predetermined number of the cylinder blocks simultaneously while the pump is mounted in position. The cylinder blocks, and their components such as valves, pistons and so forth, may then be maintained and repaired, and then replaced with the same, or a replacement cylinder block.

While one or more cylinder blocks are removed, the inner ring can be maintained. Segments of the ring cam may be maintained or repaired in situ or removed radially as illustrated in FIG. 4, and then maintained, repaired or replaced as need be.

The ring cam further comprises side plates 120 (on one or more preferably both sides of the ring cam) extending around the circumference of the ring cam, which prevent the rollers 38 from sliding off the wave-like surface of the ring cam. In embodiments with two or more ring cams, there may be one side plate positioned intermediate two cam rings and which function to prevent rollers from sliding off both cam rings. Alternatively, each of the two or more cam rings may have separate side plates, as shown in the fluid-working machine of FIGS. 1-10.

Figure 4:
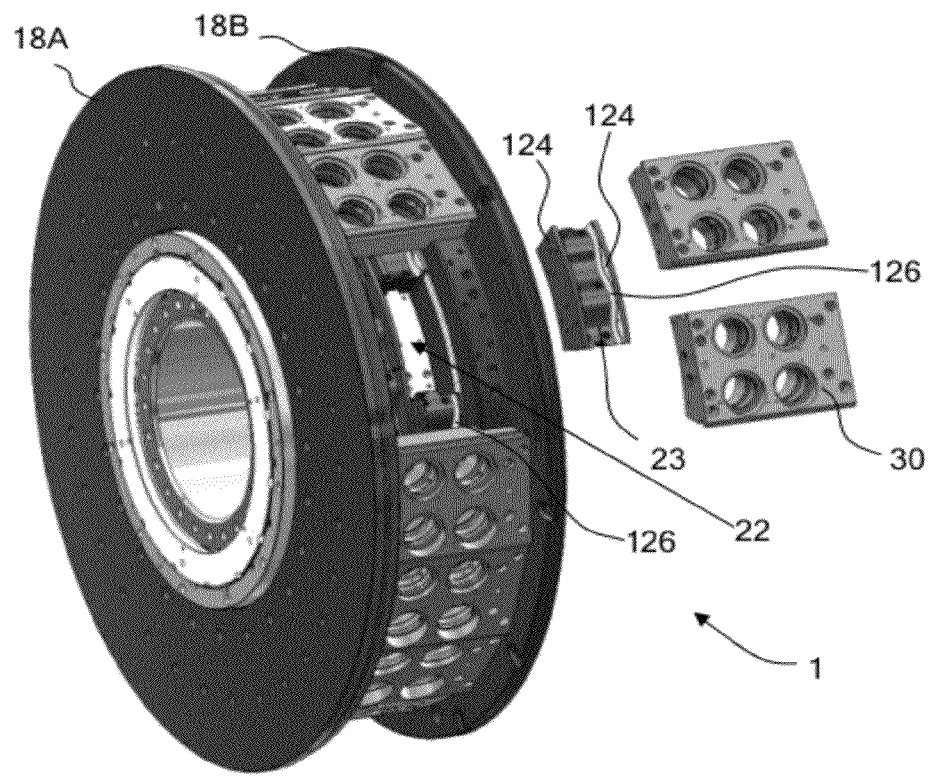
FIG. 4 is an isometric projection of the fluid working machine, without the housing, with two cylinder blocks removed and a ring cam segment removed.
Figure 9:
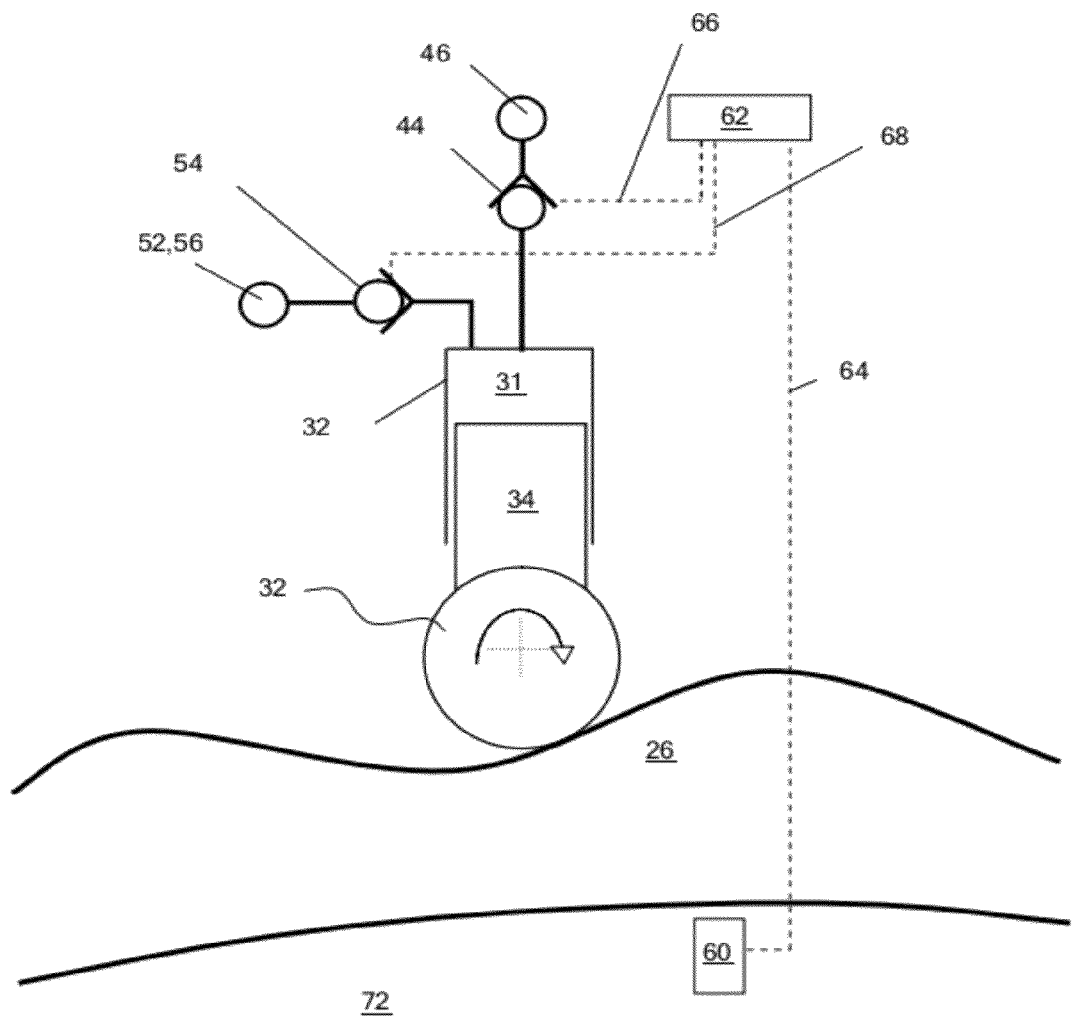
FIG. 9 is a schematic diagram of a working chamber of the fluid working machine and the valves regulating fluid flow.
Figure 10:
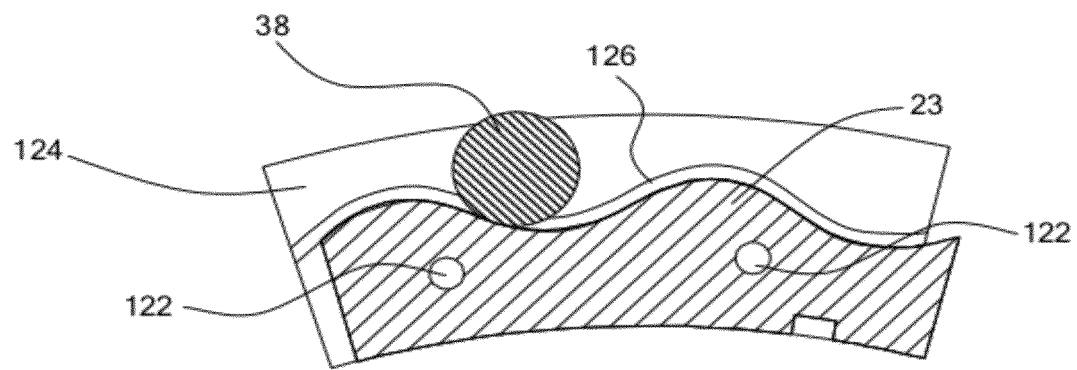
FIG. 10 is a cross sectional view of a ring cam segment assembly, perpendicular to the axis of rotation of the ring cam in use.

The side plates may be unitary, or may be segmented as shown most clearly in FIGS. 4 and 10. In the embodiment shown in FIGS. 1-10, each ring cam segment is secured to a side plate segment 124 (and typically to two side place segments, to either side of the wave like surface of the segment). In alternative embodiments there may be fewer, or more, side plate segments disposed around each side of the circumference of the or each ring cam than there are ring cam segments.

The side plates are held to the segment 23 by bolts 122 extending through cross bolt holes. The bolts may each extend through more than one ring cam.

The side plate segments may be angularly offset from the cam segments so that each side plate overlaps two (or more) segments of the assembled ring cam. Thus, and in the assembled ring cam, the joint between side plate segments does not align or overlap with the joint between segments and the overlap may be used to axially (i.e. with respect to the shaft) align the cam segments (for example during assembly and maintenance, or to reduce wear caused by motion of adjacent ring cam segments in relation to one another, when forces are applied to the wave like surface, in use). In some embodiments the side plates may be fixed to the shaft, or fixed relative to the valves and working chambers such that the cam segments move between the side plates.

Figure 11:
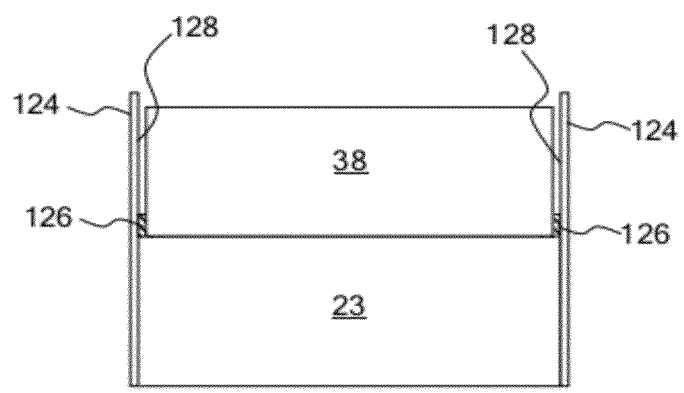
FIG. 11 is a cross sectional view of a ring cam segment assembly, parallel to the axis of rotation of the ring cam in use.

As can be best seen in FIGS. 10 and 11, the side plates further comprise abutting strips 126, at least the surface thereof being composed of a resilient and low friction material extending along the junction between the side plates and the cam surface, such as dry sliding bearing materials typically comprising a PTFE and/or bronze surface. The strips extend away from the cam surface only a small distance (in comparison to the radius of the roller 36). In use, the roller abuts the strips 126 near the point of contact between the roller and the cam surface, where the relative velocity of the roller and the side plate and is low, and is thereby prevented from contacting the inner faces 128 of the side plates, where the velocity of the roller in relation to the side plates is greater. Thus, the roller is prevented from moving laterally (i.e. in an axial direction) on the cam surface, whilst friction between the roller and the side plates is minimised.

Figures 5, 6:
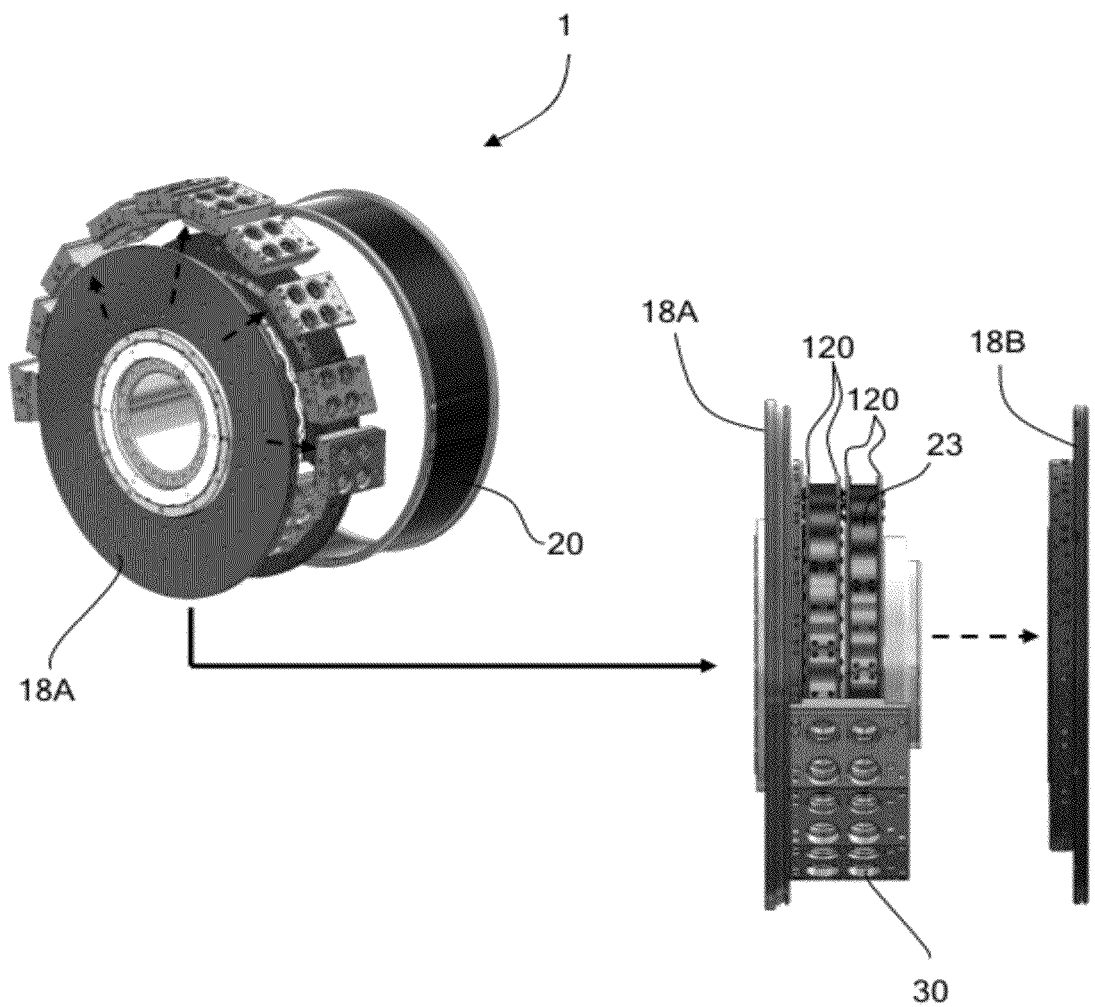
FIG. 5 is an exploded isometric view of components of the fluid working machine.
FIG. 6 is a part cut away side view of components of the fluid working machine with the back end plate removed.

FIG. 5 is an exploded view showing the components of the pump, although it would not normally be advisable, or in some embodiments possible, to remove the illustrated number of cylinder blocks simultaneously when the pump is mounted, due to the structural role of the cylinder blocks. However, as shown in FIG. 6, it may be that the second end plate is removable axially to enable the bearings to be accessed and maintained, repaired or replaced as need be without a need for the entire pump to be demounted. This is highly advantageous as the mass of the pump may be sufficiently large as to require a crane or other heavy lifting gear, whereas the second end plate and individual components such as the cylinder blocks may be removable with relatively small lifting gear.

Typically, the cylinder blocks are removed radially from the outer ring using lifting apparatus. When they are mounted, they are held in place by the axial and radial bolts and the radial bolts are tensioned sufficiently that the they exert a force which exceeds the maximum outward force expected in use, so that they remain in tension throughout normal operation. As the cylinder blocks are removed radially, the seals for delivering high pressure fluid to the second end plate are compressed only by the inwards motion of the cylinder blocks and are not subject to shear forces which would occur if they were on axially facing surfaces along which the cylinder blocks slide during mounting and demounting.

Accordingly, the invention has provided a fluid working machine which is readily maintainable in a difficult to access location, such as in the nacelle of a wind turbine tower, despite the substantial mass of machine required in applications such as large scale wind power generation.

Although the example illustrated in FIGS. 1 through 7 includes demountable cylinder blocks, it would be possible for the outward ring to comprise the ring cam and for the inward ring to include the cylinders. In this case, demountable ring cam blocks, including one or more parallel segments of ring cam would be demountably retained between the first and second end plates. The inward ring would be accessed by removal of one or several ring cam blocks, exposing the cylinders for maintenance, repaid and replacement by a radial access pathway. Again, the cylinder may be provided in demountable blocks, removably radially through the space between the first and second end plates left by the demounted ring cam blocks.

Figure 8:
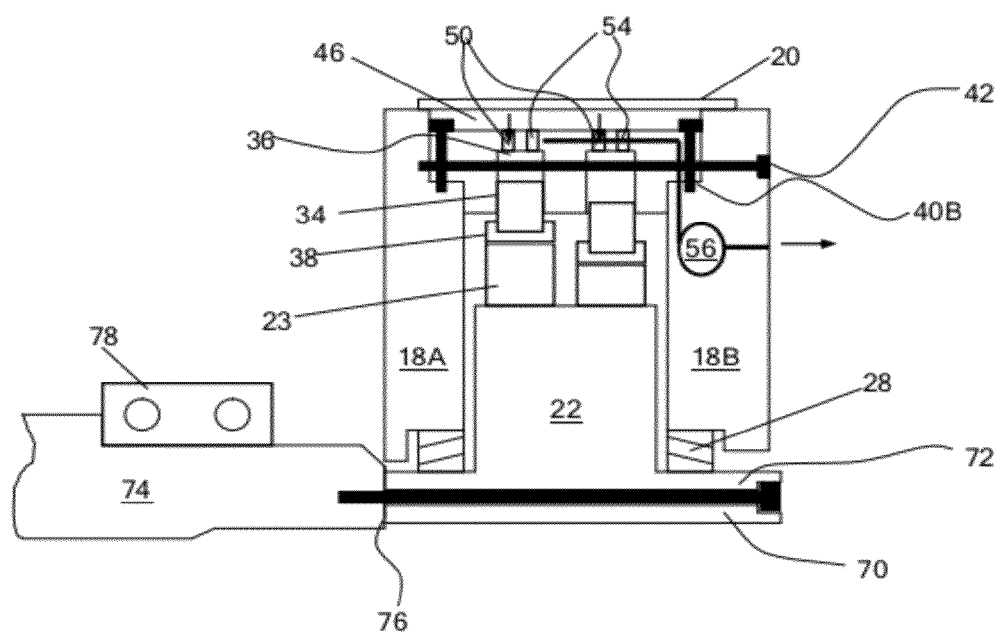
FIG. 8 corresponds to FIG. 7 with addition of the coupling to the turbine shaft.

A further feature is illustrated in FIG. 8. The drive shaft 72 of the pump is conveniently attached to the turbine shaft 74 by one or more axial bolts 70. The interface 76 may comprise a face spline, key or other coupling, or may be a friction drive. This is significantly more practical than typical arrangements for coupling a pump drive shaft to an input shaft using, for example, a shrink disk or flange plate. In particular, the pump may be detached from the turbine shaft with very low forces without requiring a significant axial withdrawal distance and without the use of complicated differential thermal expansion techniques and equipment. In use, some of the weight of the pump typically bears on the drive shaft and thereby onto the main shaft bearing 78, however the mounting plate provides additional support, sufficient to enable the axial bolts to be removed where required for maintenance.

The illustrated example is a radial piston pump, however, the fluid working machine may alternatively be a radial piston motor or a device operable as a pump or a motor in alternative operating modes or conceivably simultaneously (with some working chambers motoring and some working chambers pumping).

A number of different types of variable displacement radial piston fluid working machine are known and the invention is applicable with many of these types of machine. However, the fluid working machine may be a fluid working machine which is operable to select the volume to be displaced by working chambers during individual volume cycles on each successive cycle of working chamber volume. FIG. 9 illustrates in schematic form suitable control apparatus. An individual working chamber 31 has a volume defined by the interior surface of cylinder 32 and piston 34 which is driven from the ring cam 26 by way of roller 32 and which reciprocates within the cylinder to cyclically vary the volume of the working chamber. Pressure within the working chamber, or alternatively a spring (not shown) keeps the roller in contact with the ring cam. A shaft position and speed sensor 60 determines the instantaneous angular position and speed of rotation of the shaft, and informs a controller 62, by way of electrical connection 64, which enables the controller to determine the instantaneous phase of the cycles of each individual working chamber. The controller is typically a microprocessor or microcontroller which executes a stored program in use.

The working chamber comprises a low pressure valve (LPV) in the form of an electronically actuatable face-sealing poppet valve 44 which faces inwards toward the working chamber and is operable to selectively seal off a channel extending from the working chamber to a low pressure manifold 46, which functions generally (in the pumping mode) as a net source of fluid in use (or sink in the case of motoring). The LPV is a normally open solenoid closed valve which opens passively when the pressure within the working chamber is less than the pressure within the low pressure manifold, during an intake stroke, to bring the working chamber into fluid communication with the first low pressure manifold, but is selectively closable under the active control of the controller via a LPV control line 66 to bring the working chamber out of fluid communication with the low pressure manifold.

Alternative electronically controllable valves may be employed, such as normally closed solenoid opened valves.

The working chamber further comprises a high pressure valve (HPV) 54 in the form of a pressure actuated delivery valve. The HPV faces outwards from the working chamber and is operable to seal off a channel extending from the working chamber to a high pressure manifold 52, 56, which functions as a net source or sink of fluid in use. The HPV functions as a normally-closed pressuring-opening check valve which opens passively when the pressure within the working chamber exceeds the pressure within the high pressure manifold. The HPV may also function as a normally-closed solenoid opened check valve which the controller may selectively hold open via a HPV control line 68 once the HPV is opened by pressure within the working chamber. The HPV may be openable under the control of the controller when there is pressure in the high pressure manifold but not in the working chamber, or may be partially openable.

Importantly, as well as determining whether or not to close or hold open the primary low pressure valve on a cycle by cycle basis in the manner known from, for example, EP 0 361 927, EP 0 494 236, and EP 1 537 333, the controller is operable to vary the precise phasing of the closure of the LPV and HPV with respect to the varying working chamber volume during cycles which it has been determined that the LPV and HPV should close, and thereby to determine the time-average net displacement of fluid to or from the high pressure manifold 52,56 or low pressure manifold 46.

Further variation and modifications may be made within the scope of the invention herein disclosed.

The invention claimed is:

1. A variable displacement radial piston fluid working machine, the fluid working machine comprising:
    an inward ring and an outward ring around the inward ring;
    one of the inward ring and the outward ring comprising a rotatable ring cam, the other comprising a plurality of radially extending cylinders circumferentially spaced around the respective ring, each cylinder having a piston reciprocably mounted therein;
    a drive shaft coupled to the ring cam;
    the outward ring comprising first and second axially spaced structural members and a plurality of demountable blocks demountably retainable therebetween, each of the plurality of demountable blocks comprising either more than one of said plurality of cylinders or a segment of the ring cam respectively, each said block being mountable to locate one or more said cylinders in opposing relation to a portion of the ring cam to enable the pistons to be driven by the ring cam and demountable to expose the inward ring for access.

2. A variable displacement radial piston fluid working machine as claimed in claim 1, wherein the demountable blocks are individually demountable.

3. A variable displacement radial piston fluid working machine as claimed in claim 1, wherein the demountable blocks are demountable by radially outwards motion.

4. A variable displacement radial piston fluid working machine according to claim 1, wherein at least some cylinders or the segment of the ring cam of a demountable block are mounted to the body of the demountable block and not directly mounted to the first or second axially spaced structural elements.

5. A variable displacement radial piston fluid working machine as claimed in claim 1, wherein demountable blocks demountably retained between the first and second axially spaced structural elements resist forces between the first and second axially spaced structural members.

6. A variable displacement radial piston fluid working machine as claimed in claim 1, wherein one of the first and second axially spaced structural elements comprises or is attached to a coupling for coupling the fluid working machine to a support through said one of the first and second axially spaced structural elements.

7. A variable displacement radial piston fluid working machine as claimed in claim 1, wherein the first and second axially spaced structural elements are independently mounted on bearings.

8. A variable displacement radial piston fluid working machine according to claim 1, wherein the drive shaft extends through at least one of the axially spaced structural elements.

9. A variable displacement radial piston fluid working machine according to claim 1, wherein the first and second axially spaced structural elements and the demountable blocks comprise cooperating formations for bolting the demountable blocks to each of the first and second axially spaced structural elements both axially and radially.

10. A variable displacement radial piston fluid working machine according to claim 1, wherein the first and second axially spaced structural elements each comprise one or more shoulders having a radially outward surface for engaging with the demountable blocks, the demountable blocks having cooperating radially inward surfaces.

11. A variable displacement radial piston fluid working machine according to claim 1, wherein the demountable blocks are cylinder blocks, comprising one or more said cylinders, and the inward ring comprises a ring cam.

12. A variable displacement radial piston fluid working machine according to claim 11, wherein the ring cam comprises a plurality of ring cam segments which are individually removable in a radially outward direction between the first and second axially spaced structural elements when the or each cylinder block which would otherwise overlay the respective ring cam segment is demounted.

13. A variable displacement radial piston fluid working machine according to claim 12, wherein the ring cam comprises a side plate on one or both sides thereof, each said side plate having an inner surface adjacent the cam surface, the ring cam further comprising an abutment extending across a part of the inner surface of each said side plate.

14. A variable displacement radial piston fluid working machine according to claim 13, wherein each said abutment comprises or consists of resilient or low friction material.

15. A variable displacement radial piston fluid working machine according to claim 12, wherein the ring cam comprises a side plate on one or both sides thereof, the or each side plate comprising a plurality of side plate segments.

16. A variable displacement radial piston fluid working machine according to claim 15, wherein each said side plate segment are angularly offset from said ring cam segments, and each side plate overlaps two or more segments of the assembled ring cam.

17. A variable displacement radial piston fluid working machine according to claim 15, wherein each said ring cam segment is secured to one or more side plate segments.

18. A variable displacement radial piston fluid working machine according to claim 17, wherein each said ring cam segment and one or more side plate segments secured thereto, are removable as a unit in a radially outward direction.

19. A variable displacement radial piston fluid working machine according to claim 11, wherein at least one of the axially spaced structural elements comprises one or more ports for receiving working fluid, and wherein each said cylinder block includes at least one cooperating port for expelling working fluid, either or both said ports including a seal, wherein said ports and the or each seal are located on radially inward or outward facing surfaces.

20. A variable displacement radial piston fluid working machine according to claim 1, further comprising a plurality of manifolds and a plurality of valves, each of which is operable to regulate the flow of fluid between a working chamber and a manifold.

21. A variable displacement radial piston fluid working machine according to claim 20, comprising a controller and at least one valve associated with each working chamber may be an actively controllable valve, controllable by the controller in phased relationship with cycles of working chamber volume to select the net displacement of working fluid by each working chamber on a cycle by cycle basis.

22. A kit of parts which can be assembled to form a variable displacement radial piston fluid working machine according to claim 1.

23. A turbine assembly comprising a variable displacement radial piston fluid working machine according to claim 1 and a turbine comprising a plurality of blades mounted to the drive shaft to transmit torque to the ring cam as the blades rotate.

24. A method of maintaining a turbine assembly according to claim 23, comprising removing a demountable block and carrying out one or more of (a) maintaining the demountable block and remounting the maintained demountable block, (b) mounting a replacement demountable block in place of the demounted block, and (c) maintaining a portion of the inner ring through the space left by the demounted block.

25. A method of maintaining a variable displacement machine according to claim 1, comprising removing a demountable block and carrying out one or more of (a) maintaining the demountable block and remounting the maintained demountable block, (b) mounting a replacement demountable block in place of the demounted block, and (c) maintaining a portion of the inner ring through the space left by the demounted block.

26. A method according to claim 25, wherein maintaining a portion of the inner ring through the space left by the demounted block comprises removing a portion of the inner ring.

27. A variable displacement radial piston fluid working machine according to claim 1, wherein the demountable blocks comprise a segment of the ring cam, and the inward ring comprises cylinder blocks including one or more said cylinders.

28. A variable displacement radial piston fluid working machine chassis, the chassis comprising:
an inward ring and an outward ring around the inward ring;
one of the inward ring and the outward ring comprising a rotatable ring cam retaining formation, the other comprising a plurality of mountings for retaining radially extending cylinders circumferentially spaced around the respective ring;
a coupling to couple the ring cam retaining formation to a drive shaft;
the outward ring comprising first and second axially spaced structural members for demountably retaining a plurality of demountable blocks comprising either more than one of said plurality of cylinders or a segment of the ring cam respectively to locate one or more said cylinders in opposing relation to a portion of the ring cam to enable pistons slidably mounted within the cylinders to be driven by the ring cam.

* * * * *